United States Patent
Konno et al.

[11] Patent Number: 5,939,797
[45] Date of Patent: Aug. 17, 1999

[54] IGNITION CONTROL SYSTEM

[75] Inventors: Takesi Konno; Atsushi Hatayama, both of Saitama, Japan

[73] Assignee: Honda Giken Kogyo Kabushiki Kaisha, Tokyo, Japan

[21] Appl. No.: 08/972,387

[22] Filed: Nov. 18, 1997

[30] Foreign Application Priority Data

Nov. 18, 1996 [JP] Japan ................................. 8-306892

[51] Int. Cl.$^6$ .................................................. F02P 5/145
[52] U.S. Cl. .................... 307/10.3; 307/10.2; 324/380; 324/381; 123/406.12; 123/406.58; 123/609
[58] Field of Search .............................. 123/609, 406.12, 123/406.19, 406.29, 406.34, 406.51, 406.52, 406.53, 406.6, 406.63, 406.64, 406.65, 406.66; 307/9.1, 10.1, 10.3, 10.6; 324/380, 391; 701/101, 102, 110, 112

[56] References Cited

U.S. PATENT DOCUMENTS

| | | | |
|---|---|---|---|
| 4,409,943 | 10/1983 | Komurasaki et al. | 123/406.66 |
| 4,552,118 | 11/1985 | Fukaya | 123/609 |
| 4,582,034 | 4/1986 | Iwata | 123/406.37 |
| 4,829,973 | 5/1989 | White | 123/609 |
| 5,007,397 | 4/1991 | Akasu | 123/406.51 |
| 5,144,928 | 9/1992 | Komurasaki | 123/406.16 |
| 5,184,590 | 2/1993 | Hashimoto et al. | 123/406.63 |
| 5,554,891 | 9/1996 | Shimizu et al. | 307/10.3 |
| 5,723,916 | 3/1998 | Disney et al. | 307/10.6 |
| 5,798,577 | 8/1998 | Lesesky et al. | 307/10.6 |

FOREIGN PATENT DOCUMENTS

| | | |
|---|---|---|
| A8-261126 | 10/1996 | Japan . |
| 988789 | 3/1997 | Japan . |

*Primary Examiner*—Jeffrey Gaffin
*Assistant Examiner*—Albert W. Paladini

[57] ABSTRACT

An ignition control system controls an ignition of a vehicle engine based on a pulse signal generated by a pulse coil in response to a rotation of the vehicle engine by using a rectified output of a regulator for correcting a generated output of an AC-generator activated by the vehicle engine. The ignition control system does not require a dedicated AC generator and modifications of an engine layout. It includes an anti-theft feature and is applicable to vehicles that do not use a battery. The ignition control system includes a reference voltage generator that generates a reference voltage each time a rectified output is produced by a generator, and an ignition controller that controls ignition of the vehicle engine on the basis of the reference voltage and the rectified output. The ignition controller includes a voltage determining device that determines whether the rectified output is equal to or larger than a predetermined voltage, compares a reference voltage signal with the rectified output and outputs a signal indicative of a determination result. The ignition controller also includes a control device that outputs an ignition signal to an ignition coil on the basis of the comparison result signal and a pulse signal.

20 Claims, 13 Drawing Sheets

IGNITION CONTROL SYSTEM

BACKGROUND OF INVENTION

1. Field of the Invention

The present invention relates to an ignition control system which is installed in a vehicle without a battery and has an anti-theft feature.

2. Description of Related Art

The applicants have already proposed, in Japanese Patent Application No. Hei 7-66249, (herein incorporated by reference in its entirety), an ignition control system with an anti-theft function which has a nonlinear element assembled in a main switch for a vehicle that does not have a battery and enables a vehicle engine to be ignited only when a particular voltage generated by the nonlinear element is detected.

In Application No. Hei 7-66249, when the ignition system with the anti-theft feature is installed in a batteryless vehicle without making any modification to the vehicle, a vehicle engine is intermittently activated by using a rectified output of a regulator by correcting a generated output of an AC generator. It is necessary to match a voltage determining output for the anti-theft feature and pulse signal generating timing of a pulse coil with a phase of the rectified output of the regulator. This means that a dedicated AC generator is required for the anti-theft feature and that the layout of the vehicle engine has to be changed, etc. This makes it difficult for these components to be used in normal circumstances.

Further, a battery for a small vehicle such as a motorcycle has a relatively small capacity. When the battery is dead after prolonged non-use, for example, measures have to be taken in order to activate the vehicle engine by kick-starting or pushing the vehicle.

It is difficult to cope with such a request in the foregoing ignition control system.

The present invention is contemplated in order to overcome the foregoing problem without the use of a dedicated AC generator or layout modification of a vehicle engine, is intended to provide an ignition control system which has an anti-theft feature, and is applicable to a vehicle that does not have a battery.

SUMMARY OF THE INVENTION

In order to accomplish the foregoing objects of the present invention, there is provided an economical ignition control system that is applicable to battery-less vehicles and includes an anti-theft feature. The ignition control system includes a reference voltage generator that generates a reference voltage each time a rectified output is produced and an ignition controller that controls ignition of the vehicle engine on the basis of the reference voltage and the rectified output. The ignition controller includes a voltage determining device that determines whether the rectified output is equal to or larger than a predetermined voltage, compares a reference voltage signal with the rectified output, and outputs a signal indicative of a determination result. The ignition controller also includes a controller that outputs an ignition signal to an ignition coil on the basis of the comparison result signal and a pulse signal.

According to this preferred embodiment of the invention, it is possible to improve the reliability of the voltage determining device. Further, it is not necessary to match a pulse signal generating timing of a pulse coil with a phase of a generated output of an AC generator. This provides the benefit of allowing vehicle components to be used in common.

The controller may include a digital controller that in a preferred embodiment has an ignition timing computer that computes ignition timing of the vehicle engine at a front half of the pulse signal cycle based on the pulse signal and pulse cycle and outputs an ignition timing signal indicative of the computed ignition timing to the igniting device. The digital controller also has an ignition controller that receives—at a latter half of the pulse signal cycle after the computation of the ignition timing by the ignition timing computer—the determination signals each time the rectified output is produced, performs a majority determination based on the received determination signals, and controls permission or suspension of the ignition in a succeeding pulse signal cycle in response-to the ignition timing signal. This arrangement is effective in precisely computing the ignition timing without accelerating a computation speed of the ignition timing computer.

In another preferred embodiment, the digital controller includes a pulse cycle measuring device that measures the cycle of the pulse signal and outputs a pulse cycle signal, a differential computer that computes cyclic variations of the pulse signal and outputs a differential signal indicative of the computed result, a pulse cycle estimator that estimates a cycle of a succeeding pulse signal based on the pulse cycle signal and the differential signal and outputs a pulse cycle signal indicative of the estimated result, an ignition controller that produces an ignition control signal based on the determination signal and the pulse cycle signal, a ignition timing computer that computes ignition timing of the vehicle engine based on the pulse signal and the pulse cycle estimating signal and outputs an ignition timing signal indicative of the computed ignition timing, and an igniting device for outputting an ignition signal to the ignition coil on the basis of the ignition control signal and the ignition timing signal. Therefore, the ignition control system enables vehicle engines having different characteristics to be optimally ignited in accordance with an engine speed. Further, it is not necessary to match the pulse signal generating timing of the pulse coil with the phase of the generated output of an AC generator, and is therefore effective in enabling components to be used in common.

In yet another embodiment of the present invention, the controller may also include an analog controller having an igniting device that outputs an ignition signal to an ignition coil in response to the pulse signal, an igniting power source that provides power to the igniting device, and a switch (or igniting power source switch) for enabling/disabling the supply of power to the igniting power source in response to the determination signal. Accordingly, it is not necessary to match the pulse signal generating timing of the pulse coil with the phase of the generated output of an AC generator, and is therefore effective in enabling components to be used in common.

The switch also includes an control switch adapted to turn on the switch only when the determination signal denotes allowance of ignition and to turn off the switch when the determination signal denotes a state other than allowance of ignition. Therefore, it is possible to reliably control the ignition based on the determination result of the voltage determining device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
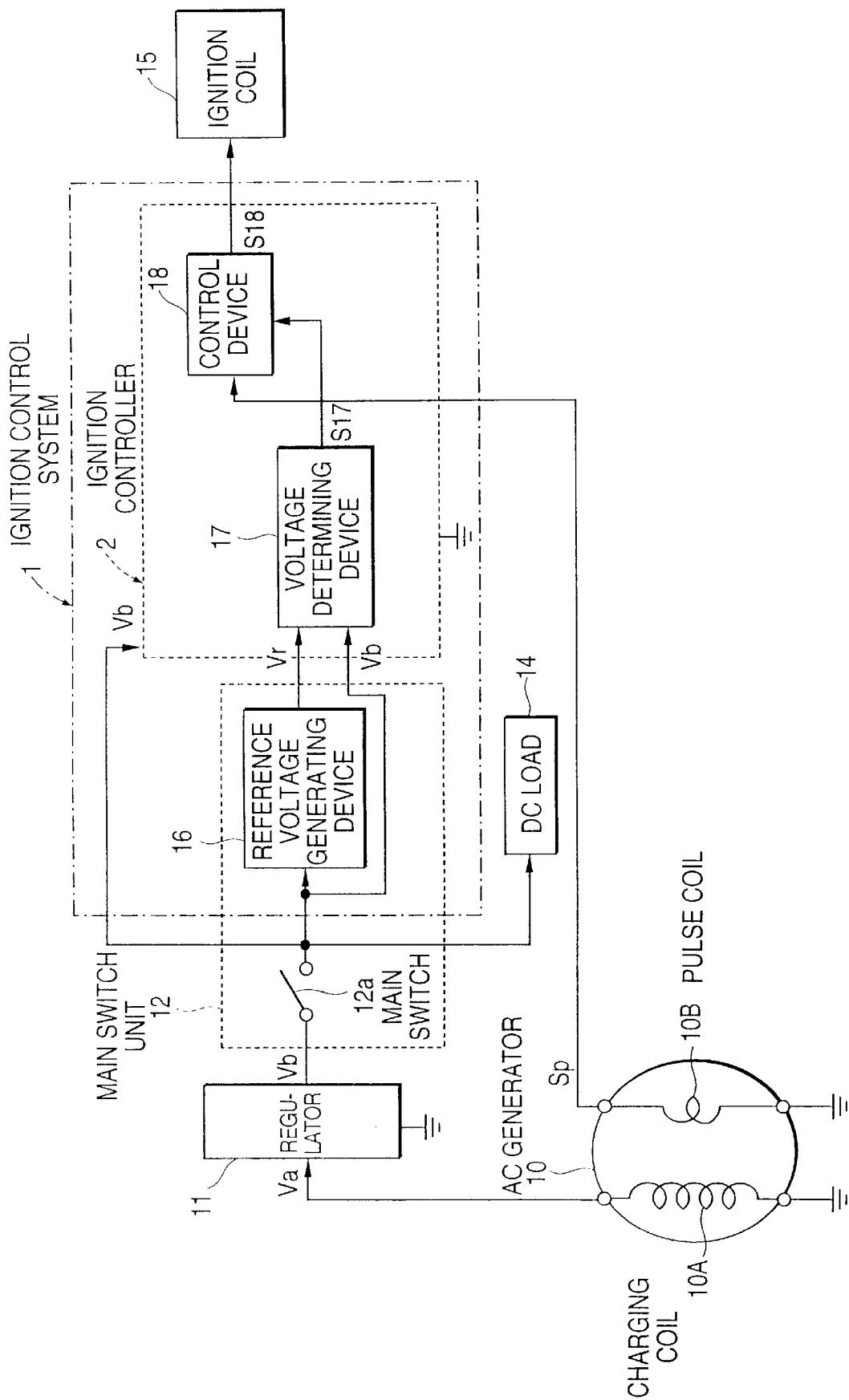
FIG. 1 is a block diagram of an ignition control system according to a preferred embodiment of the present invention.

The exemplary embodiments of the invention claimed in the appended claims may be more fully appreciated by reference to the following description of preferred embodiments. Within the drawing figures, it should be understood that like elements are identified by like reference numbers.

FIG. 1 is a block diagram showing a main part of an ignition control system 1 according to the present invention. Referring to FIG. 1, the ignition control system 1 comprises a reference voltage generator 16 and an ignition controller 2. The ignition controller 2 includes a voltage determining device 17 and a control device 18. An AC generating device 10, a regulator 11, a main switch 12, a DC load 14, and an ignition coil 15 are arranged around the ignition control system 1.

A charging coil 10A of the AC generator 10 generates AC power in response to the rotation of a vehicle engine. Generally, the AC generator 10 has several poles (e.g., a single phase and 8 poles ), so that the charging coil 10A generates the AC power for operating the vehicle engine in the pole number/2 cycles per rotation thereof (for example, four cycles if there are 8 poles).

A pulse coil 10B of the AC generator 10 produces one pulse signal Sp per rotation of the vehicle engine. The regulator 11 corrects a generated output Va of the charging coil 10A, and outputs a rectified output Vb to the reference voltage generating device 16 of the ignition control system 1 via the main switch 12.

The reference voltage generating device 16 generates a reference voltage Vr using the rectified output Vb, and outputs the reference voltage Vr to the voltage determining device 17. However, the reference voltage generating device 16 cannot generate the reference voltage Vr in a predetermined range when the rectified output Vb of the regulator is insufficient or below a threshold.

The voltage determining device 17 checks whether the reference voltage Vr is in the predetermined range each time the regulator 11 supplies the rectified output Vb. When the reference voltage Vr is not in the predetermined range, the voltage determining device 17 produces a determination signal S17 by integrating determination signals indicative of ignition suspension, and outputs the determination signal S17 to the control device 18.

When the reference voltage Vr is determined to be in the predetermined range, the voltage determining device 17 compares the reference voltage Vr with the rectified output Vb to determine whether the rectified output Vb is equal to or larger than the reference voltage Vr. If not, the voltage determining device 17 provides the control device 18 with the determination signal S17 which is produced by integrating the determination signals indicative of the ignition suspension.

When the reference voltage Vr is in the predetermined range and when the rectified output Vb is equal to or larger than the reference voltage Vr, the voltage determining device 17 provides the control device 18 with the determination signal S17 which is produced by integrating the determination signals indicative of allowance of the ignition.

Even when the pulse signal Sp is input from the pulse coil JOB, the control device 18 does not output an ignition signal S18 to the ignition coil 15 if the determination signal S17 from the voltage determining device 17 has a level lower than the predetermined level.

On the contrary, when the determination signal S17 has a level equal to or larger than the predetermined level, the control device 18 outputs the ignition signal S18 to the ignition coil 15 in response to the pulse signal Sp from the pulse coil 10B. The ignition coil 15 ignites the vehicle engine in response to the ignition signal S18 from the control device 18.

The ignition control system 1 includes the reference voltage generating device 16, voltage determining device 17 and control device 18, so that the voltage determining device 17 can determine the voltage with-improved reliability. Further, it is not necessary to match the pulse signal generating timing of the pulse coil with the phase of the generated output of the AC generator. Components can therefore be applied to common use and the invention can provide an economical ignition control system which is applicable to a vehicle without a battery and has an anti-theft feature.

Figure 2:
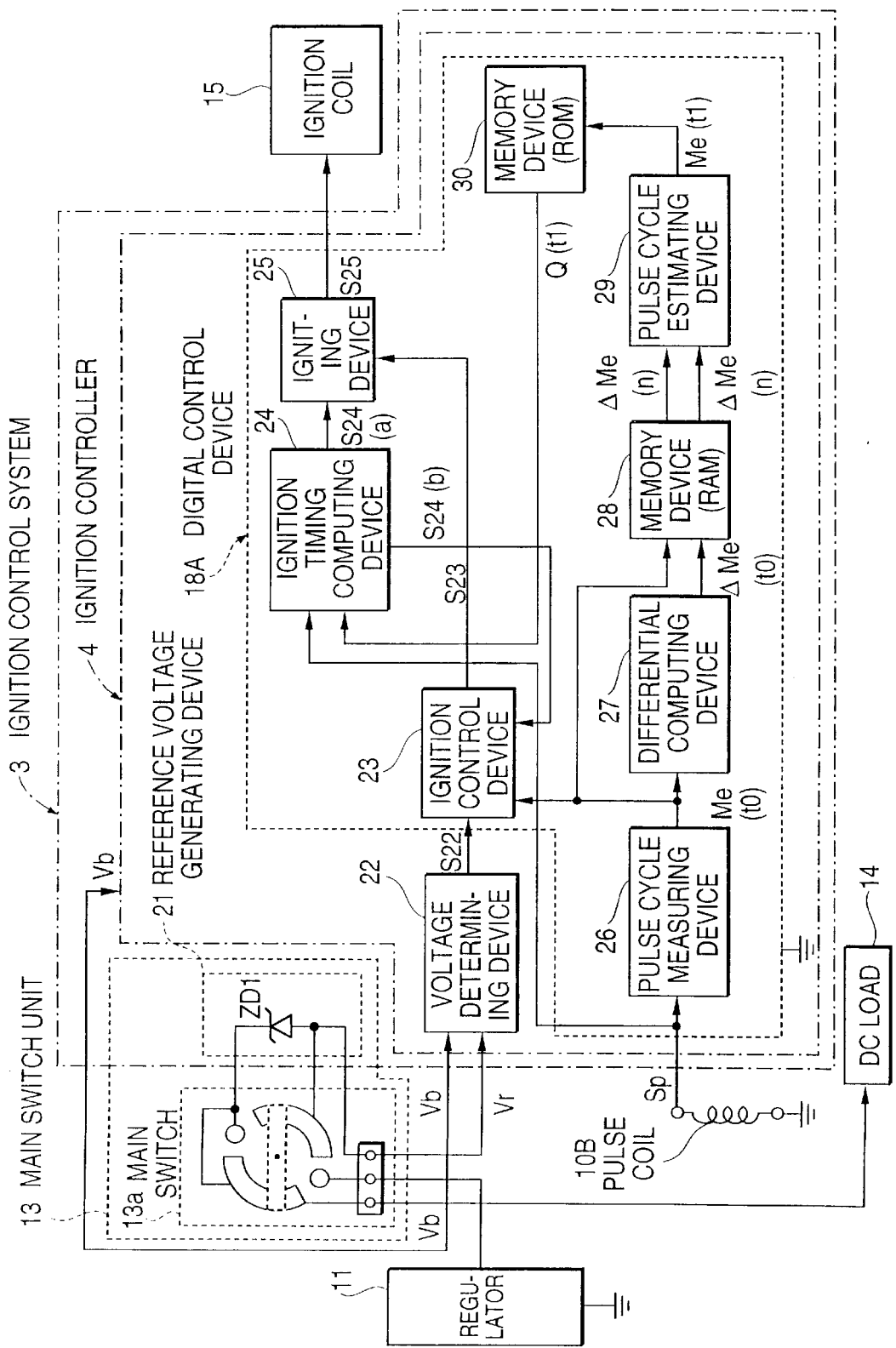
FIG. 2 is a block diagram of another ignition control system according to another preferred embodiment of the present invention.

FIG. 2 is a block diagram of a main part of an ignition control system 3 according to the present invention. The ignition control system 3 comprises a reference voltage generating device 21 and an ignition controller 4.

The ignition controller 4 includes a voltage determining device 17 and a digital control device 18A.

The digital control device 18A comprises a CPU (Central Processor Unit) as a main part, an ignition control device 23, an ignition timing computing device 24, an igniting device 25, a pulse cycle measuring device 26, a differential computing device 27, a first memory device 28, a pulse cycle estimating device 29, and a second memory device 30.

The reference voltage generating device 21 produces the reference voltage Vr at a Zener diode ZD1 from the rectified output Vb supplied by the regulator 11 via the main switch 13.

Figure 3:
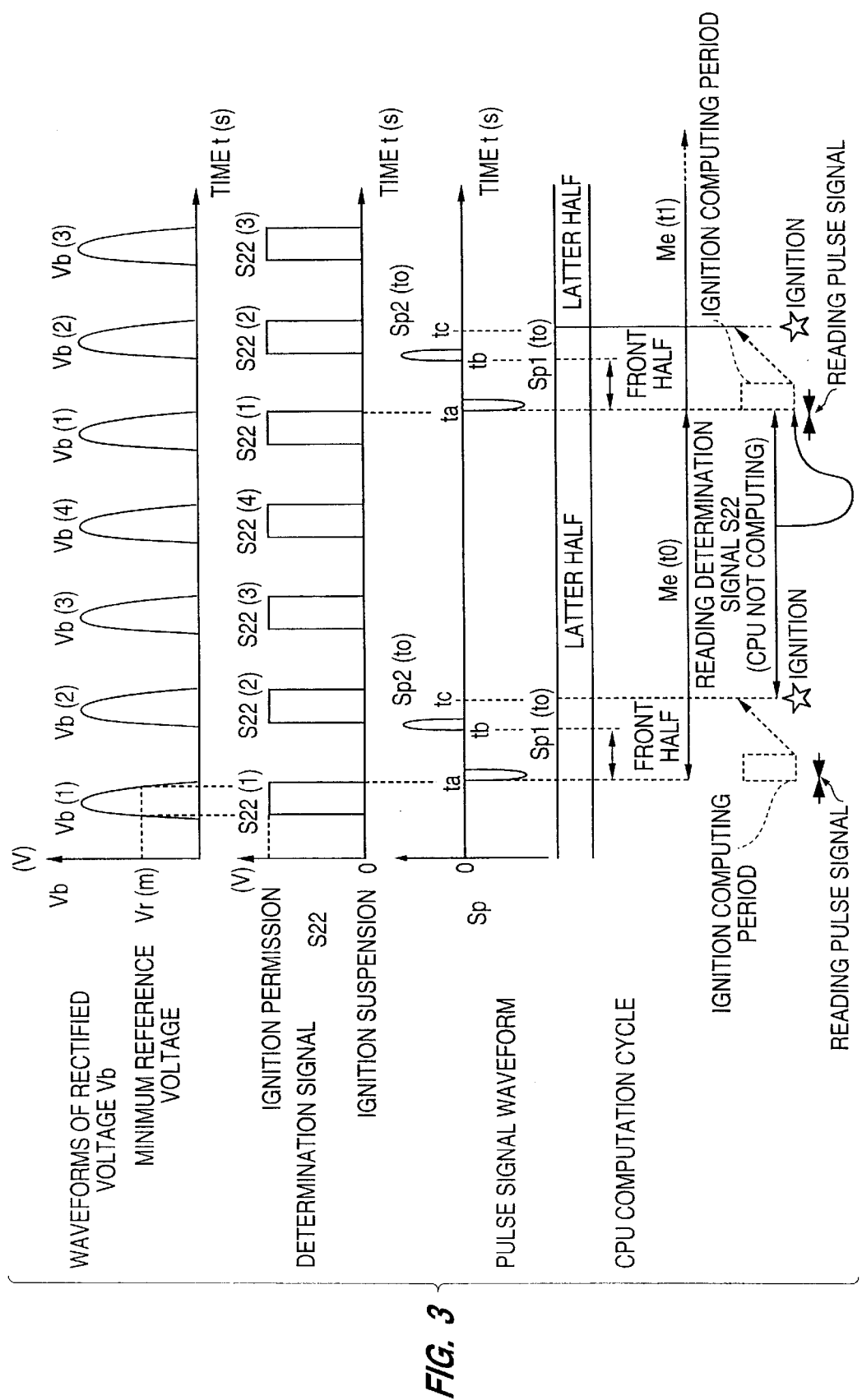
FIG. 3 is a diagram for explaining the operation of the ignition control systems of the present invention.

The operation of the ignition control system in FIG. 2 will be described with reference to FIG. 3. FIG. 3 shows waveforms of the rectified outputs Vb produced by the regulator 11 by correcting the generated output Va of the AC generator 10 having, for example, eight poles. The waveforms of the rectified outputs Vb are four half-wave rectified waveforms Vb(1), Vb(2), Vb(3) and Vb(4) per rotation of the vehicle engine.

A minimum reference voltage Vr(m) is a Zener voltage of the Zener diode ZD1, for example. The reference voltage Vr becomes zero when the rectified output Vb of the regulator 11 is equal to or less than the Zener voltage of the Zener diode ZD1.

The voltage determining device 17 determines whether or not the reference voltage Vr is within the predetermined range, each time the rectified output Vb is output by the regulator 11. If not, the voltage determining device 17 outputs a determination signal S22 (voltage 0) indicative of the ignition suspension.

When the reference voltage Vr is within the predetermined range, the voltage determining device 17 compares the reference voltage Vr with the rectified output Vb in order to check whether the rectified output Vb is equal to or larger than the reference voltage Vr. If not, the voltage determining device 17 provides the ignition control device 23 with the determination signal S22 (voltage 0) indicative of allowance of ignition.

When the reference voltage Vr is within the predetermined range and when the rectified output Vb is equal to or larger than the reference voltage Vr, the voltage determining device 17 provides the ignition control device 23 with the determination signal indicative of allowance of ignition.

FIG. 3 shows the determination signals {S22(1)~S22(4)} indicative of allowance of ignition of the voltage determining device 17.

The pulse cycle measuring—device 26 measures cycles of the pulse signals generated by the pulse coil 10B in response to the rotation of the vehicle engine, and outputs a pulse cycle signal Me(t) to the control device 23 and the memory device 28.

In addition, FIG. 3 shows waveforms of the pulse signals Sp which are equal to an engine speed and are generated by the pulse coil 10B. The pulse signals Sp are negative signals Sp1(t) and positive signals Sp2(t). The pulse cycle measuring device 26 measures a period between time ta of the negative signal Sp1(+O) and time td of the negative signal Sp1(tl).

The ignition control device 23 provides the igniting device 25 with the ignition control signal S23 on the basis of the determination signal S22, pulse cycle signal Me(t), and an ignition control start signal S24(b) from the ignition timing computing device 24. The ignition control start signal S24(b) will be described later.

The ignition control device 23 outputs the ignition control signal S23 for permitting ignition in the case of a first rotation of the vehicle engine {when the pulse cycle signal Me(t)<26.09 ms} after the activation of the digital control device 18A (CPU).

The ignition control device 23 outputs the ignition control signal S23 for suspending ignition in the case of rotations other than the first rotation after the activation of the digital control device 18A (CPU, for example) when the pulse cycle signal Me(t) is less than 26.09 ms.

When the pulse cycle signal Me(t) is equal to or larger than 26.09 ms, the ignition control device 23 reads, during a latter half of a CPU computing cycle (i.e. while the CPU is not computing), the determination signals {S22(2), S22(3), S22(4) and S22(1)} each time the rectified output Vb is provided, thereby performing majority determination. Specifically, if three or more-determination signals S22 represent allowance of an ignition, the ignition control device 23 provides the igniting device 25 with the ignition control signal S23 for permitting the ignition.

When two or more determination signals S22 denote the ignition suspension, the ignition control device 23 provides the ignition device 25 with the ignition control signal S23 for suspending the ignition.

In the digital control device 18A, the differential computing device 27 and the pulse cycle estimating device 29 compute or process data, which are necessary for the ignition timing computing device 24 to compute ignition timing, during latter halves (tb~td, te-) of the cycle Me(t) shown in FIG. 3.

The differential computing device 27 computes a differential between the current pulse cycle signal Me(t0) and the previous pulse cycle signal Me(-t1), and outputs a differential signal ΔMe(t0) to the first memory device 28.

The first memory device 28 comprises a RAM (Random Access Memory) etc., sequentially stores N pulse cycle signals Me(t) and N differential computation results ΔM2(t) which are differentials between the N pulse cycle signals Me(t) and their previous pulse cycle signals Me(-t), and sequentially provides the pulse cycle estimating device 29 with N pulse cycle signals Me(n) and differential signals ΔMe(n).

The pulse cycle estimating device 29 sequentially estimates pulse cycles following the current pulse cycle signal Me(t1) on the basis of N pulse cycle signals Me(n) and the differential signals ΔMe(n), and outputs an estimated pulse cycle signal Me(t1) to the second memory device 30.

The second memory device 30 includes, for example, a PROM (Programmable Read only Memory), and stores ignition angle data, i.e. time data, for the estimated pulse cycle signal Me(t1). The second memory device 30 provides the ignition timing computing device 24 with ignition angle data θ(t1) corresponding to the estimated pulse cycle signal Me(t1) as an address.

Figure 7A:
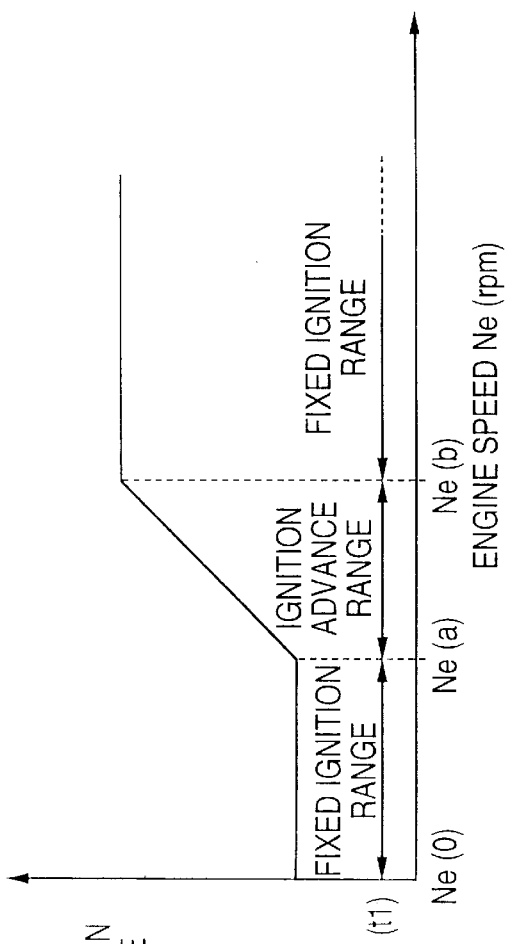
FIG. 7(a) and FIG. 7(b) show ignition angle data θ(tl) characteristics with respect to engine speeds Ne (rpm).
Figure 7B:
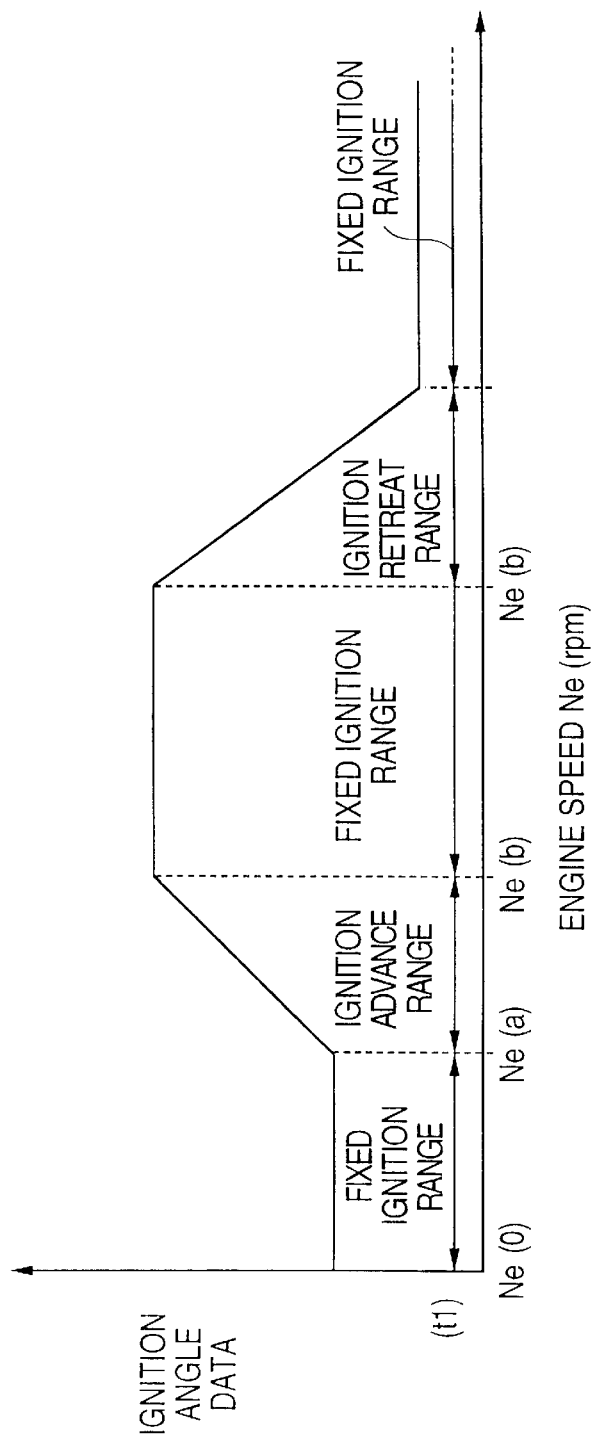

FIGS. 7(a) and 7(b) are graphs showing ignition angle data θ(t1) characteristics with respect to an engine speed Ne (rpm), {where Ne=60/Me(T1)}.

Referring to FIG. 7(a), the ignition angle data θ(t1) remains unchanged for engine speeds between Ne(O) and Ne(a) and thus, is in a fixed ignition range. For the engine speeds Ne between Ne(a) and Ne(b), the ignition angle data θ(t1) is in an ignition advancing range. The ignition angle data θ(t1) is another fixed ignition range for the engine speeds Ne greater than Ne(b). The second memory device 30 stores these ignition angle data θ(t1).

The ignition timing computing device 24 performs computation or processing for deriving ignition timing in the front halves (ta-tb, td-te) of the cycle Me(t) shown in FIG. 3. Specifically, the ignition timing computing device 24 computes the ignition timing on the basis of the ignition angle data θ(t1) and time ta where the pulse signal Sp1(t1) is produced, and outputs an ignition timing signal S24(a) to the igniting device 25 at time tf.

When the ignition control signals S23 denote allowance of ignition, the igniting device 25 outputs an ignition signal S25 to the ignition coil 15 at the time tf where the ignition timing signal S24(a) is input. Conversely, when the ignition control signals S23 denote the ignition suspension, the igniting device 25 does not output any ignition timing signal S24(a) to the ignition coil 15. The foregoing operations are repeatedly carried out.

Figure 4:
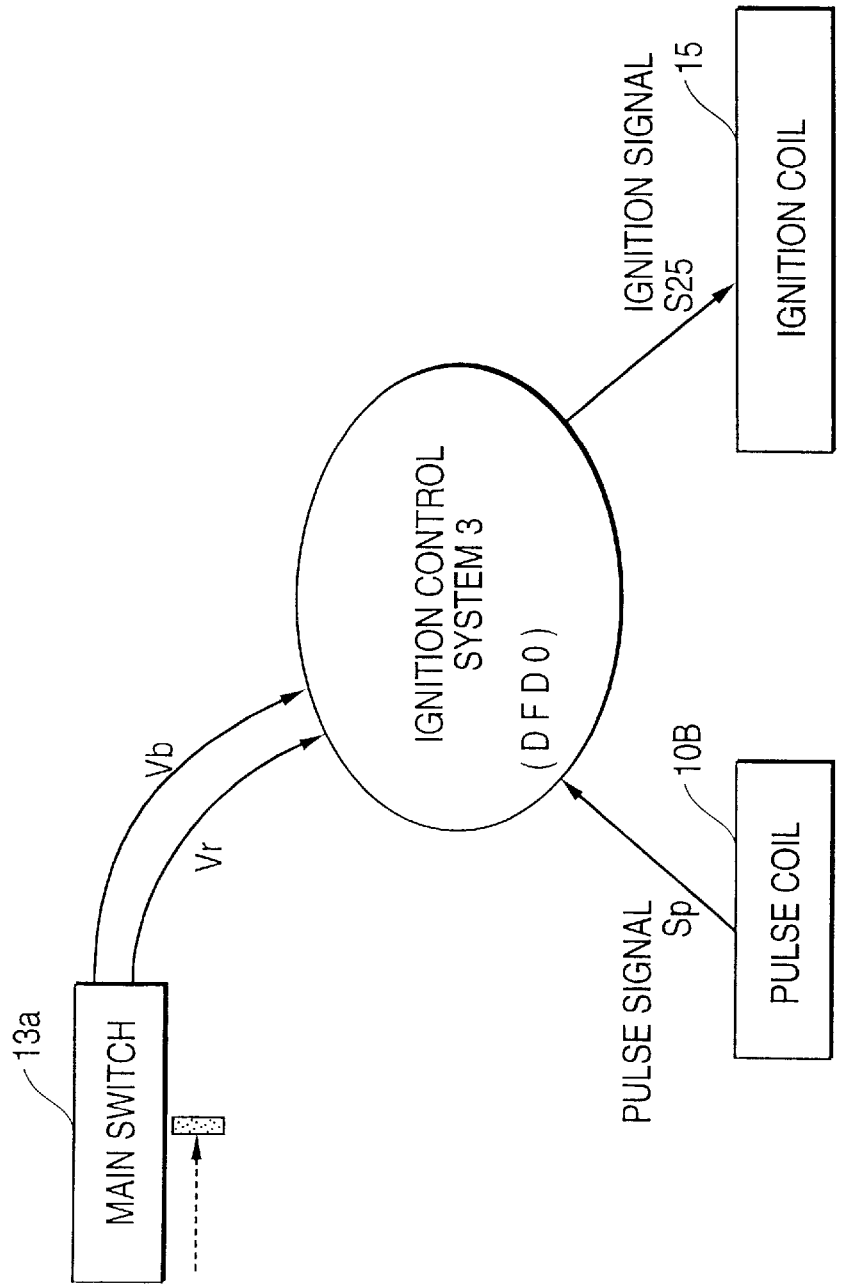
FIG. 4 is a context diagram of the ignition control systems according to the present invention.

FIG. 4 is a context diagram of an ignition control system 3 according to the present invention. The ignition control system 3 outputs the ignition signal S25 to the ignition coil 15 based on the rectified output Vb and reference voltage Vr from the main switch 13a, and in response to the pulse signal Up from the pulse coil 10B.

Figure 5:
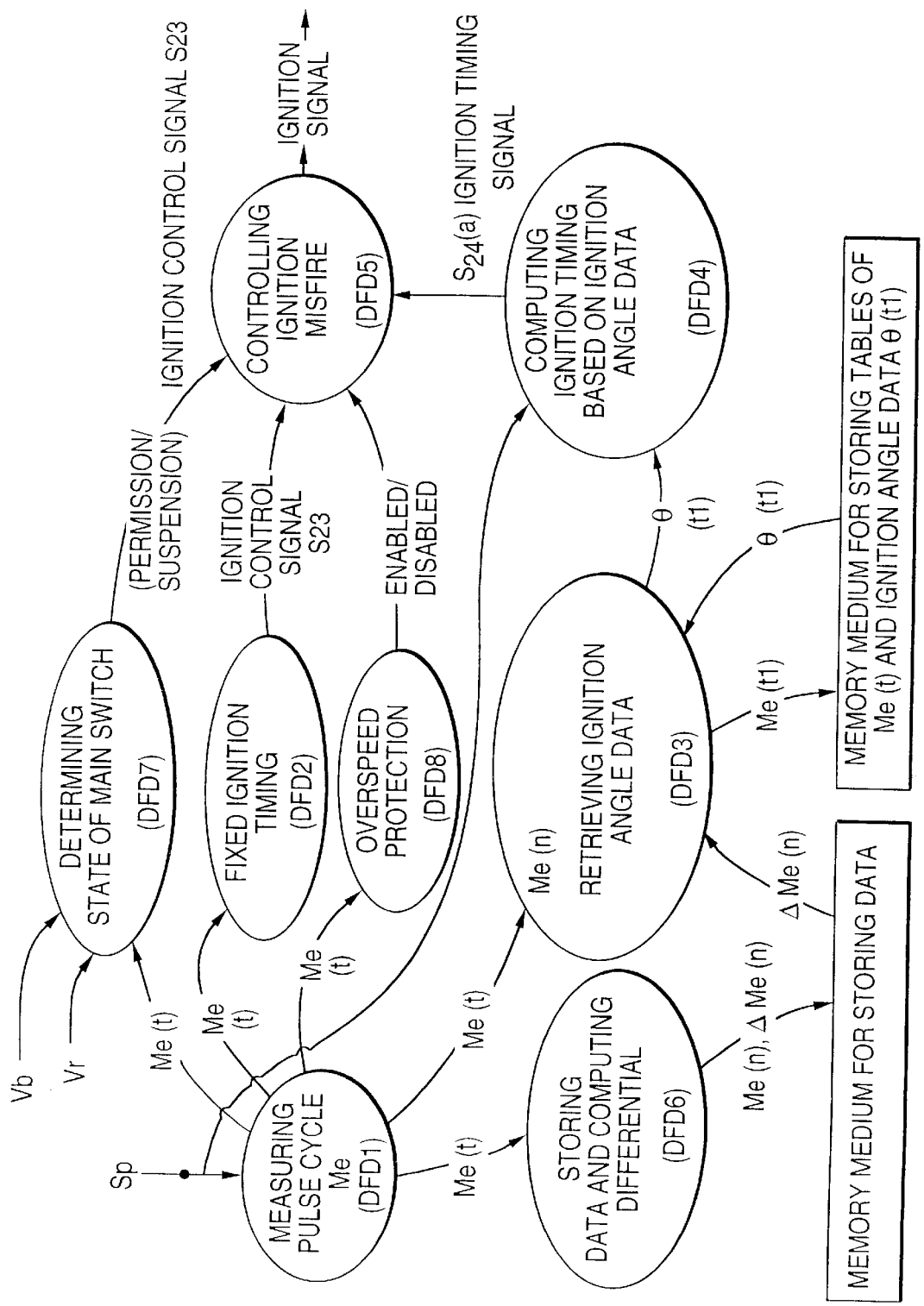
FIG. 5 is a data flow diagram of the ignition control systems according to the present invention.

FIG. 5 is a data flow diagram (DFD) of the ignition control system 3. DFD1 measures the pulse cycle Me based on the pulse signal Sp, and outputs a pulse cycle signal Me(t) to DFD2, DFD3, DFD6, DFD7, and DFD8.

DFD2 fixes the ignition timing based on the pulse cycle signal Me(t), and outputs the ignition control signals S23 (denoting fixed ignition) to DFD5. DFD8 outputs an overspeed protection signal to DFD5 in response to the pulse cycle signal Me(t). DFD6 computes N differentials ΔMe(n) based on the pulse cycle signal Me(t), and stores N pulse cycle signals Me(n) and N differentials ΔMe(n) in memory media.

DFD3 reads the ignition angle data θ(t1) corresponding to the N pulse cycle signals Me(t) from the memory media, corrects the ignition angle data θ(t1) using N differentials ΔMe(n), and outputs the corrected ignition angle data Δ(t1) to DFD4. DFD4 computes the ignition timing based on the pulse signal Sp and the ignition angle data O(t1), and outputs the ignition timing signal S24(a) to DFD5. DFD5 controls ignition/misfire in response to the ignition control signal S23 and the ignition timing signal S24(a), and outputs the ignition signal to the ignition coil.

Figure 6:
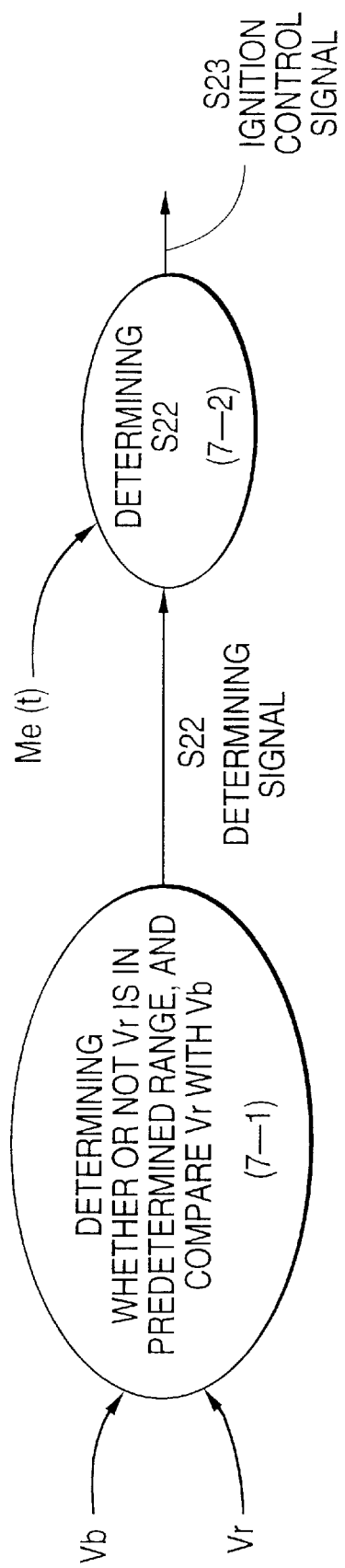
FIG. 6 is a detailed data flow diagram of an igniting power source switch.

FIG. 6 shows details of the data flow diagram DFD7. In FIG. 6, DFD7 checks whether the reference voltage Vr is within the predetermined range at step (7-1), compares the reference voltage Vr with the rectified output Vb, determines whether the rectified output Vb is larger than the reference Vr, and outputs the determination signal S22 at step (7-2). Step (7-2) in DFD7 outputs the ignition control signal S23 in response to the pulse cycle signal Me(t) and the determination signal S22.

As described above, the ignition control system 3 includes the reference voltage generating device 21, voltage determining device 17, ignition control device 23, ignition timing computing device 24, igniting device 25, pulse cycle measuring device 29 and second memory device 30, thereby improving the reliability of the voltage determining device 17, and enabling vehicle engines having different characteristics to be optimally ignited in accordance with engine speeds. Therefore, it is not necessary to match the generation timing of the pulse signal Sp in the pulse coil 10B with the phase of the generated output Va of the AC generator 10, which enables components to be applied in common usage.

Figure 8:
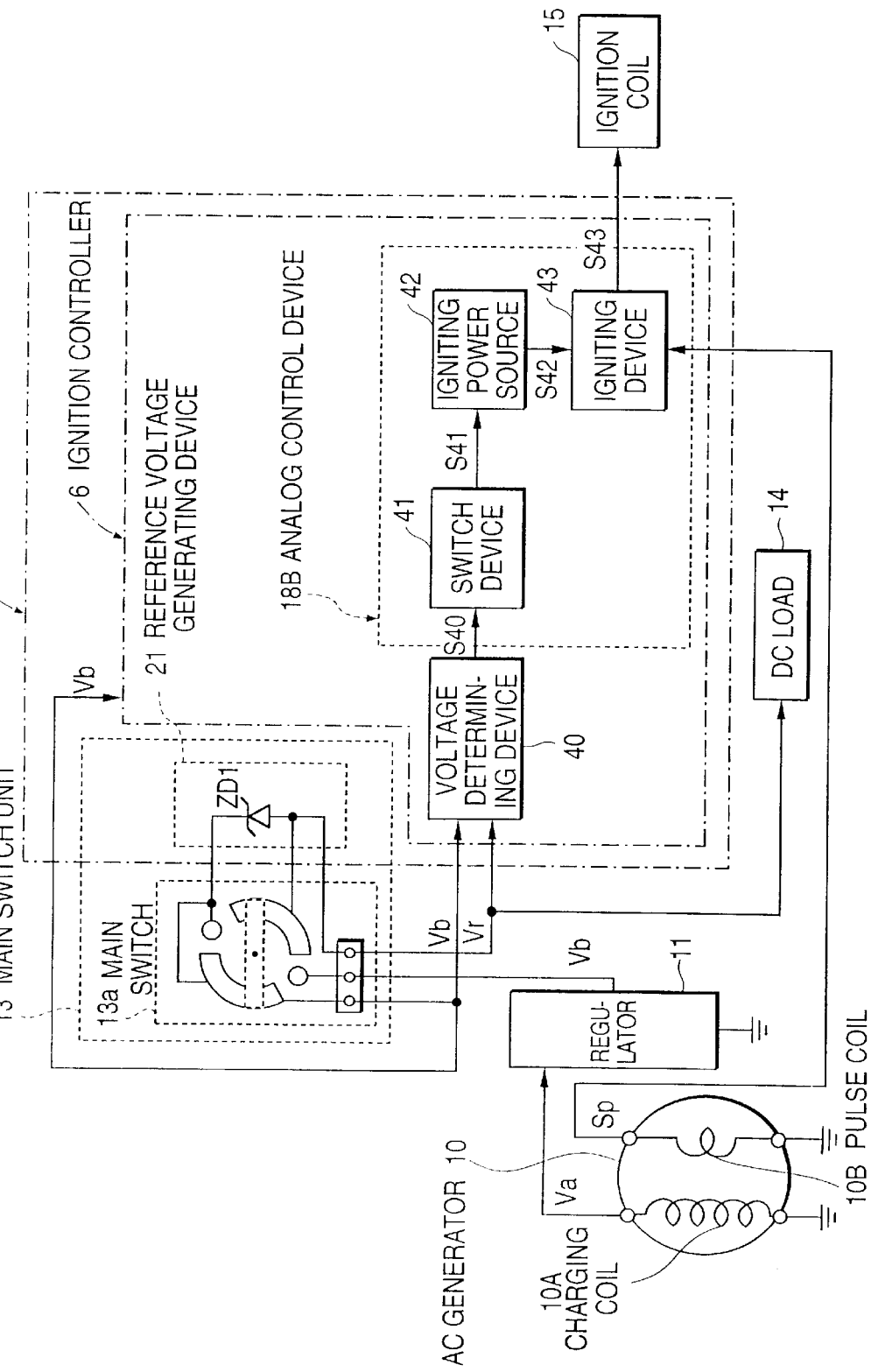
FIG. 8 is a block diagram of a main part of a further ignition control system according to another embodiment of the present invention.

FIG. 8 is a block diagram of a main part of an ignition control system 5 according to an embodiment of the present invention. The ignition control system 5 includes a reference voltage generating device 21 and an ignition controller 6. The ignition controller 6 comprises a voltage determining device 17 and an analog control device 18B. The analog control device 18B includes a switch device 41, an igniting power source 42, and an igniting device 43.

The operation of the ignition control system 5 shown in FIG. 8 will be described with reference to FIGS. 11 and 12.

Figure 11:
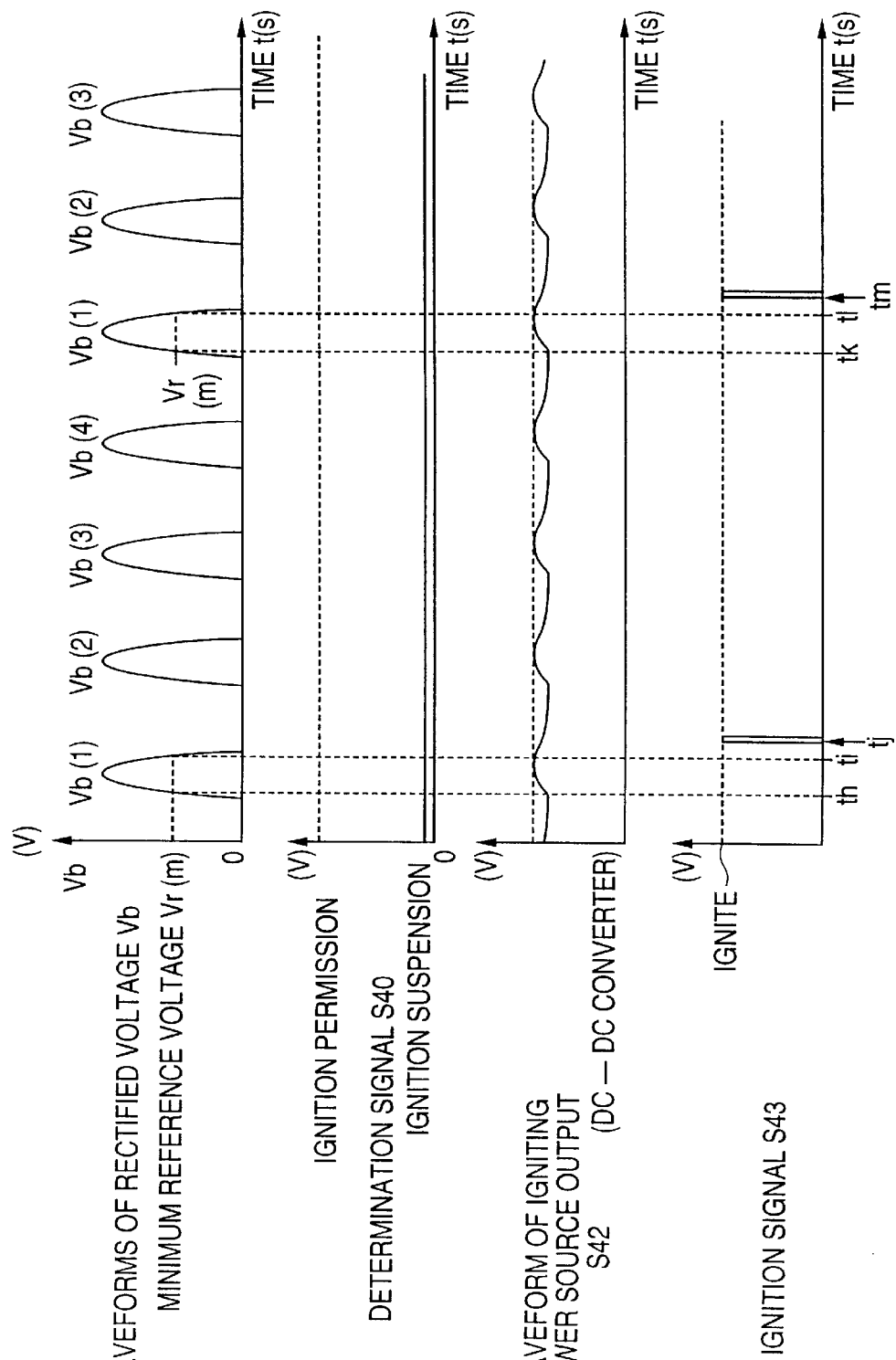
FIG. 11 is a diagram showing the regular operation of the ignition control systems of the present invention.

FIG. 11 shows a regular operation of the ignition control system. FIG. 12 shows a anti-theft operation of the ignition control system.

The reference voltage generating device 21 generates the reference voltage Vr from the rectified output Vb supplied from the regulator 11 via the main switch 13, using the Zener diode ZD1, and outputs the reference voltage Vr to the voltage determining device 17.

Figure 12:
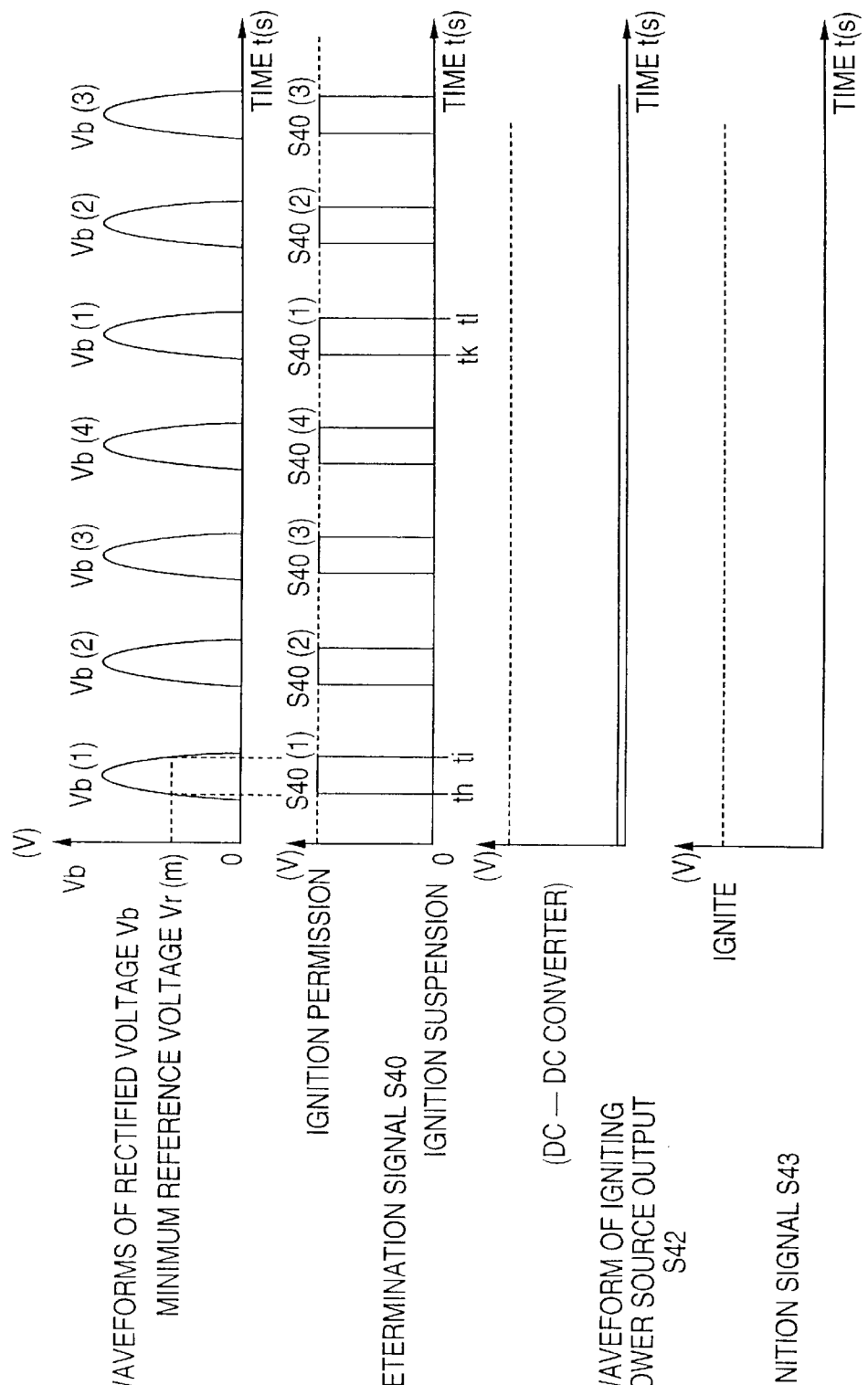
FIG. 12 is a diagram showing the anti-theft operation of the ignition control systems of the present invention.

FIGS. 11 and 12 show waveforms of the rectified output Vb which is obtained by rectifying the generated output Va of the 8-pole AC generator 10, in the regulator 11. The waveform of the rectified output Vb has four half waveforms Vb(1), Vb(2), Vb(3) and Vb(4) per rotation of the vehicle engine.

A minimum reference voltage Vr(m) is a Zener voltage of the Zener diode ZD1. The reference voltage Vr becomes zero when the rectified output Vb of the regulator 11 is equal to or less than the Zener voltage of the Zener diode ZD1.

Each time the regulator 11 outputs the rectified output Vb, the voltage determining device 17 determines whether or the reference voltage Vr is within the predetermined range. If not, the voltage determining device 17 outputs to the switch device 41 the determination signal S40 {S40(1)~S40(4)} indicative of the ignition suspension shown in FIG. 12.

Further, each time the regulator 11 outputs the rectified output Vb, the voltage determining device 17 determines whether the reference voltage Vr is within the predetermined range. If the reference voltage Vr is within the predetermined range, the voltage determining device 17 compares the reference voltage Vr with the rectified output Vb from the regulator 11, and determines whether the rectified output Vb is equal to or larger than the reference voltage Vr. If not, the voltage determining device 17 also outputs to the switch device 41 the determination signal S40 {S40(1)–S40(4)} indicative of the ignition suspension, shown in FIG. 12.

Only when the reference voltage Vr is within the predetermined range and when the rectified output Vb is equal to or larger than the reference voltage Vr, the voltage determining device 17 provides-the switch device 41 with the determination signal S40 indicative of allowance of ignition, as shown in FIG. 11.

The switch device 41 controls the igniting power source 42 of the igniting device 43 in response to the determination signal S40. When the determination signal S40 denotes allowance of ignition, the switch device 41 controls the igniting power source 42 in order to supply an output S42 (shown in FIG. 11) to the igniting device 43. The igniting device 43 outputs an ignition signal S43 (shown in FIG. 11) to the ignition coil 15 in response to the pulse signal Sp from the pulse coil 10B.

When the determination signal S40 denotes the ignition suspension, the switch device 41 nullifies the output S24 of the igniting power source 42-(shown in FIG. 12), and prevents the igniting device 43 from igniting.

As described above, the ignition control system 5 includes the reference voltage generating device 21, voltage determining device 17, switch device 41, igniting power source 42, and igniting device 43, thereby improving the reliability of the voltage determining device 17. Therefore, it is not necessary to match the generation timing of the pulse signal Sp in the pulse coil 10B with the phase of the generated output Va of the AC generator 10, which allows components to be used in common.

Figure 9:
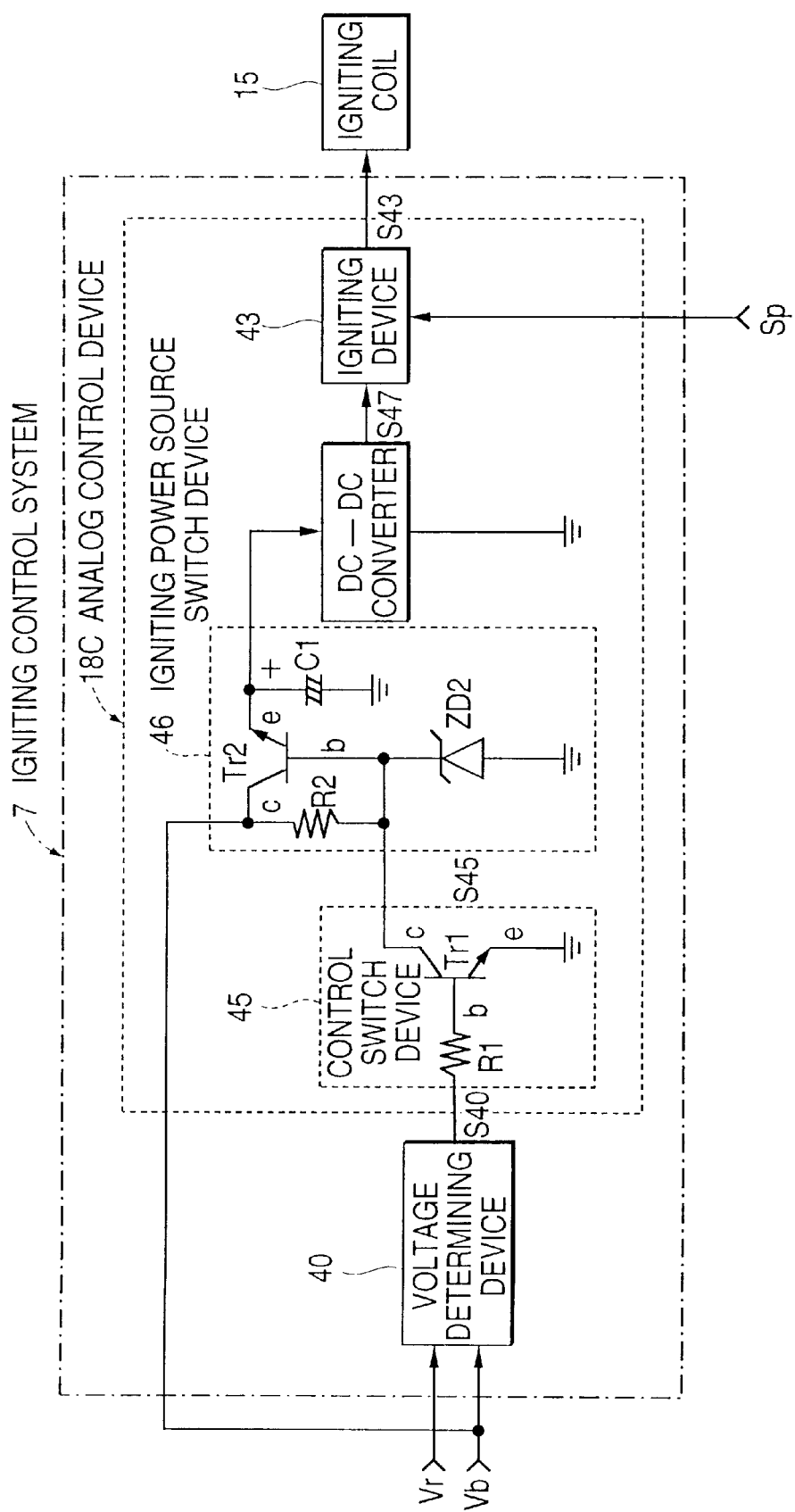
FIG. 9 is a block diagram of a main part of a still further ignition control system according to still another embodiment of the present invention.

FIG. 9 is a block diagram of a main part of an ignition control system 7 according to an embodiment of the present invention. The ignition control system 7 includes a voltage determining device 17 and an analog control device 18C. The analog control device 18C includes a control switch device 45, an igniting power source switch device 46, a DC-DC converter 47, and an igniting device 43.

The control switch device 45 includes a protecting resistor R1 and a switching transistor Tr1. When a determination signal S40 of the voltage determining device 17 denotes allowance of ignition (as shown in FIG. 11, for example), the control switch device 45 is turned off since the switching transistor Tr1 becomes non-conductive. Conversely, when the determination signal S40 denotes an allowance of ignition (as shown in FIG. 12, for example), the control switch device 45 is turned on since the switching transistor Tr1 becomes conductive.

The igniting power source switch device 46 includes a biasing resistor R2, a Zener diode ZD2, a switching transistor Tr2, and a capacitor C1.

When the determination signal S40 denotes an allowance of ignition, the control switch device 45 is turned off, a base terminal of the switch transistor Tr2 is biased by the biasing resistor R2 and the Zener diode ZD2, the switch transistor Tr2 becomes conductive, the igniting power source switch device 46 is turned on, and the rectified output Vb is applied to the DC-DC converter 47. The DC-DC converter 47 supplies an igniting voltage S47, so that the igniting device 43 outputs an ignition signal S43 to the ignition coil.

When the determination signal S40 denotes the ignition suspension, the control switch device 45 is turned on, the base terminal of the switch transistor Tr2 has a zero potential, the switching transistor Tr2 becomes nonconductive, and the igniting power source switch device 46 is turned off so that no rectified output Vb is applied to the DC-DC converter 47. The igniting device 43 suspends ignition since the igniting voltage S47 becomes the zero potential in the DC-DC converter 47.

Figure 10:
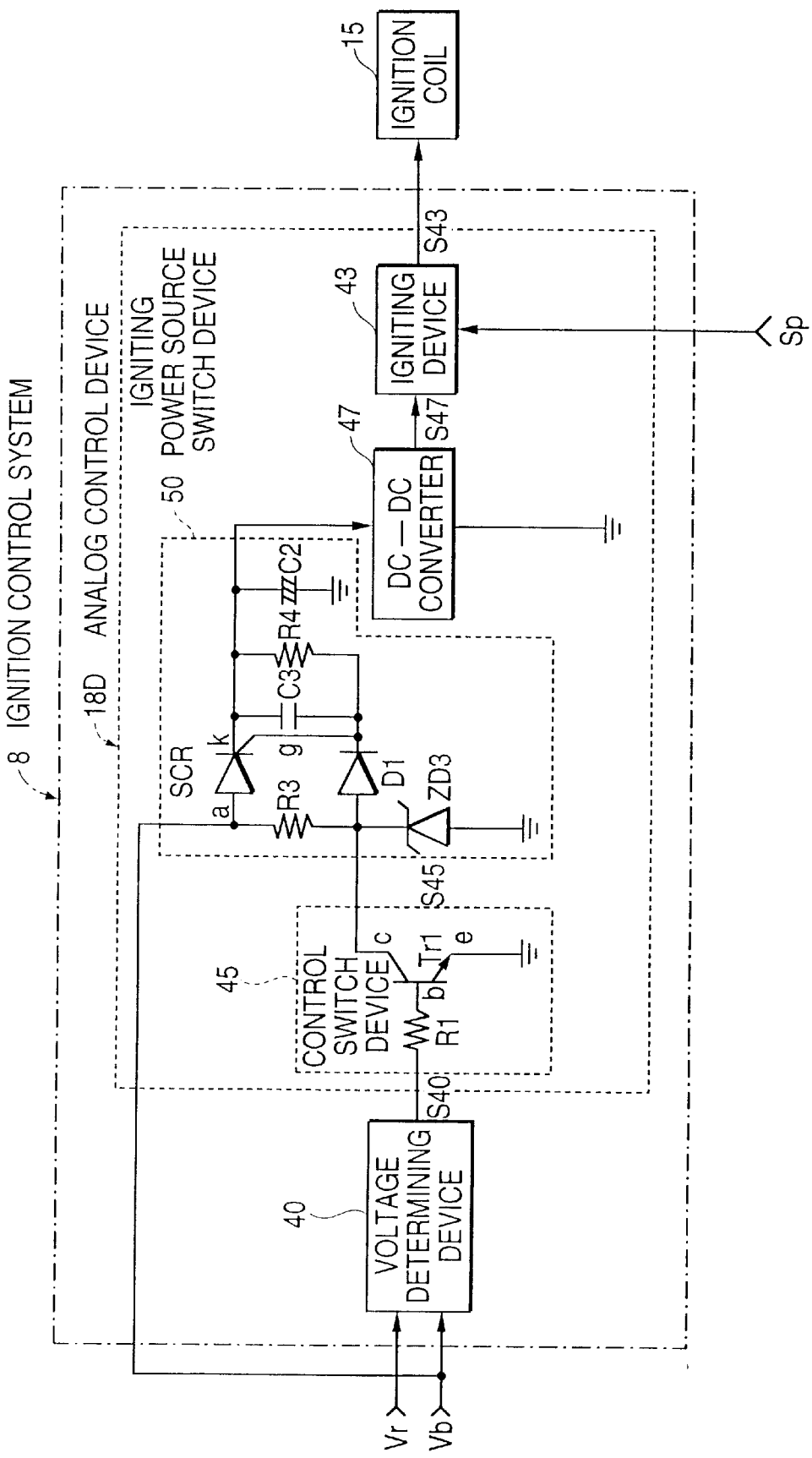
FIG. 10 is a block diagram of a main part of a further ignition control system according to a further embodiment of the present invention.

FIG. 10 is a block diagram of a main part of an ignition control system 8 according to an embodiment of the present invention. The ignition control system 8 includes a voltage determining device 17 and an analog control device 18D.

The analog control device 18D comprises a control switch device 45, an igniting power source switch device 50, a DC-DC converter 47, and an igniting device 43. The igniting power source switch device 50 includes a biasing resistor R3, a biasing resistor R4, a Zener diode ZD3, an SCR t Silicon Controlled Rectifier), a diode D1, a capacitor C2, and a capacitor C3.

In the ignition control system 8, the igniting power source switch device 50 has the SCR as a switching element in place of the transistor which is used for the igniting power source switch device 46 of the ignition control system 7.

When a determination signal S40 denotes an allowance of ignition, the control switch device 45 is turned off, a gate terminal of the SCR is biased by the biasing resistors (R3, R4), diode D1 and Zener diode ZD2, the SCR becomes conductive, the igniting power source switch device 50 is turned on, and the rectified output Vb is applied to the DC-DC converter 47. However, when the determination signal S40 denotes the ignition suspension, the control switch device 45 is turned on, the SCR has a zero potential at its gate terminal and becomes non-conductive, and the igniting power source switch device 46 is turned on, so that the rectified output Vb is applied to the DC-DC converter 47.

Figure 13:
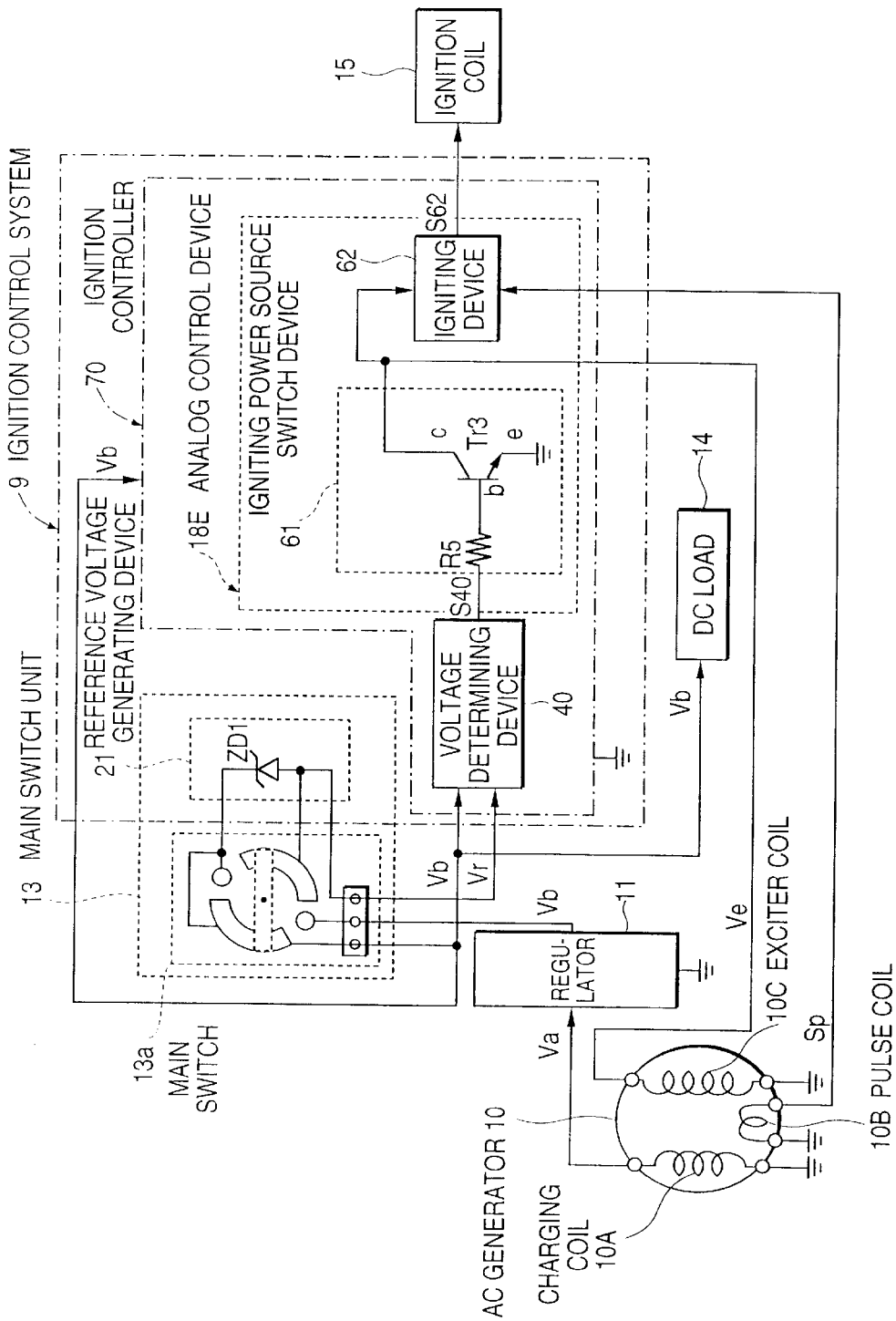
FIG. 13 is a block diagram of a still further ignition control system according to yet another embodiment of the present invention.

FIG. 13 is a block diagram of an ignition control system 9 according to another embodiment of the present invention. The ignition control system 9 includes a reference voltage generating device 21 and an ignition controller 10. The ignition controller 10 includes a voltage determining device 17 and an analog control device 18E. The analog control device 18E includes an igniting power source switch device 61 and an igniting device 62.

The igniting power source switch device 61 includes a protecting resistor R5 and a switching transistor Tr3.

When the determination signal S40 of the voltage determining device 17 denotes allowance of ignition as shown in FIG. 11, for example, the switch transistor Tr3 becomes nonconductive in the igniting power source switch device 61, the igniting power source switch device 61 is turned off, and an AC voltage Ve of an exciter coil 10C is applied to the igniting device 62 as an igniting power source voltage.

Conversely, when the determination signal S40 of the voltage determining device 17 denotes the ignition suspension (shown in FIG. 12, for example), the switching transistor Tr3 of the igniting power source switch device 61 becomes conductive, the igniting power source switch device 61 is turned on, the exciter coil 10C is shorted, and the igniting power source voltage of the igniting device 62 becomes the zero potential. Therefore, the igniting device 62 suspends ignition.

It should be apparent from the aforementioned description and attached drawings that the concept of the present application may be readily applied to a variety of preferred embodiments including those disclosed herein. Accordingly, the scope of the invention described in the instant application should be limited solely by the appended claims.

The present invention provides a compact, reliable and economical ignition control system which is installed in a vehicle without a battery, and has an anti-theft function, and is compact, reliable and economical.

What is claimed is:

1. An ignition control system for controlling an ignition of an engine, comprising:

reference voltage generating means for generating a reference voltage each time an output signal is produced; and ignition controller means for controlling ignition of the engine based on the reference voltage and the output signal, the ignition controller means including:

voltage determining means for comparing the reference voltage signal with the output signal, and outputting a comparison result signal, and control means for outputting an ignition signal to an ignition coil on the basis of the comparison result signal and a pulse signal.

2. The ignition control system of claim 1, wherein the control means comprises a digital control means including:

ignition timing computing means for computing an ignition timing of the engine at a front half of a pulse signal cycle based on the pulse signal and outputting an ignition timing signal indicative of the computed ignition timing;

ignition control means for receiving, at a latter half of the pulse signal cycle after the computation of the ignition timing by the ignition timing computing means, the comparison result signal each time the output signal is produced, performing a majority determination based on the comparison result signal, and outputting an ignition control signal based on the majority determination to control allowance of the ignition in a succeeding pulse signal cycle; and igniting means for receiving the ignition timing signal and the ignition control signal and outputting an ignition signal based on the received signals.

3. The ignition control system of claim 1, wherein the control means comprises analog control means including:

igniting means for outputting an ignition signal in response to the pulse signal;

an igniting power source that provides power to the igniting means; and switch means for enabling and disabling a supply of power to the igniting power source in response to the comparison result.

4. The ignition control circuit of claim 1, wherein the control means comprises analog control means including:

igniting means for outputting an ignition signal in response to the pulse signal;

igniting power source switch means for enabling/disabling a supply of power to the igniting power source; and control switch means for enabling the igniting power source switch means when the determination signal denotes allowance of ignition, and for disabling the igniting power source switch means when the comparison result denotes a state other than allowance of ignition.

5. The ignition control circuit of claim 1, wherein the output signal is output from a regulator that rectifies a generated output of an AC generator activated by the engine, and the pulse signal is generated by a pulse coil.

6. The ignition control system of claim 1, wherein the control means comprises digital control means including:

pulse cycle measuring means for measuring the cycle of the pulse signal and outputting a pulse cycle signal;

differential computing means for computing cyclic variations of the pulse signal and outputting a differential signal indicative of the computed result;

pulse cycle estimating means for estimating a cycle of a succeeding pulse signal based on the pulse cycle signal and the differential signal and outputting a pulse cycle estimating signal indicative of the estimated result;

ignition control means for producing an ignition control signal based on the comparison result and the pulse cycle signal;

ignition timing computing means for computing ignition timing of the engine based on the pulse signal and the pulse cycle estimating signal, and outputting an ignition timing signal indicative of computed ignition timing; and igniting means for outputting an ignition signal based on the ignition control signal and the ignition timing signal.

7. The ignition control system of claim 6, further comprising:

first memory means for sequentially storing the pulse cycle signal and the differential signal and for sequentially providing the pulse cycle signal and the differential signal to the pulse cycle estimating means; and second memory means for storing an ignition angle data and for providing the ignition timing computing means with the ignition angle data corresponding to the pulse cycle estimating signal.

8. A method for controlling an ignition of an engine, comprising:

(a) generating a reference voltage each time an output signal is produced; and (b) controlling ignition of the engine based on the reference voltage and the output signal, wherein step (b) includes:

(c) comparing the reference voltage signal with the output signal, and outputting a comparison result signal, and (d) outputting an ignition signal to an ignition coil on the basis of the comparison result signal and a pulse signal.

9. The method of claim 8, wherein step (d) comprises a digital control method including:

computing an ignition timing of the engine at a front half of a pulse signal cycle based on the pulse signal;

providing an ignition timing signal indicative of the computed ignition timing;

receiving, at a latter half of the pulse signal cycle after the computation of the ignition timing, the comparison result signal each time the output signal is produced;

performing a majority determination based on the comparison result signal;

providing an ignition control signal based on the majority determination to control allowance of the ignition in a succeeding pulse signal cycle; and outputting an ignition signal based on the receiving the ignition timing signal and the ignition control signal.

10. The method of claim 8, wherein step (d) comprises an analog control method including:

outputting an ignition signal in response to the pulse signal;

providing power to the igniting means; and enabling and disabling a supply of power to the igniting power source in response to the comparison result.

11. The method of claim 8, wherein step (d) comprises an analog control method including:

outputting an ignition signal in response to the pulse signal;

enabling and disabling a supply of power to the igniting power source; and enabling the outputting of the ignition signal when the determination signal denotes allowance of ignition, and for disabling the outputting of the ignition signal when the comparison result denotes a state other than allowance of ignition.

12. The method of claim 8, wherein step (d) comprises a digital control method including:

measuring the cycle of the pulse signal and producing a pulse cycle signal;

computing cyclic variations of the pulse signal;

producing a differential signal indicative of the computed result;

estimating a cycle of a succeeding pulse signal based on the pulse cycle signal and the differential signal;

producing a pulse cycle estimating signal indicative of the estimated result;

producing an ignition control signal based on the comparison result and the pulse cycle signal;

computing ignition timing of the engine based on the pulse signal and the pulse cycle estimating signal;

producing an ignition timing signal indicative of computed ignition timing; and outputting an ignition signal based on the ignition control signal and the ignition timing signal.

13. The method of claim 12, further comprising:

sequentially storing the pulse cycle signal and the differential signal;

sequentially providing the pulse cycle signal and the differential signal to the pulse cycle estimating means;

storing and providing an ignition angle data corresponding to the pulse cycle estimating signal.

14. An ignition control system for controlling an ignition of an engine, comprising:
- a reference voltage generator that generates a reference voltage each time an output signal is produced; and
- an ignition controller that controls ignition of the engine based on the reference voltage and the output signal, the ignition controller including:
  - a voltage determining device that compares the reference voltage signal with the output signal, and outputs a comparison result signal, and
  - a control device that outputs an ignition signal to an ignition coil on the basis of the comparison result signal and a pulse signal.

15. The ignition control system of claim 14, wherein the control device comprises a digital control device including:
- an ignition timing computing device that computes an ignition timing of the engine at a front half of a pulse signal cycle based on the pulse signal and outputs an ignition timing signal indicative of the computed ignition timing;
- an ignition control device that receives, at a latter half of the pulse signal cycle after the computation of the ignition timing by the ignition timing computing device, the comparison result signal each time the output signal is produced, performs a majority determination based on the comparison result signal, and outputs an ignition control signal based on the majority determination to control allowance of the ignition in a succeeding pulse signal cycle; and
- an igniting device that receives the ignition timing signal and the ignition control signal and outputs an ignition signal based on the received signals.

16. The ignition control system of claim 14, wherein the control device comprises an analog control device including:
- an igniting device that outputs an ignition signal in response to the pulse signal;
- an igniting power source that provides power to the igniting means; and
- a switch that enables and disables a supply of power to the igniting power source in response to the comparison result.

17. The ignition control circuit of claim 14, wherein the control device comprises an analog control device including:
- an igniting means that outputs an ignition signal in response to the pulse signal;
- an igniting power source switch that enables and disables a supply of power to the igniting power source; and
- a control switch that enables the igniting power source switch when the determination signal denotes allowance of ignition, and that disables the igniting power source switch when the comparison result denotes a state other than allowance of ignition.

18. The ignition control circuit of claim 14, wherein the output signal is output from a regulator that rectifies a generated output of an AC generator activated by the engine, and the pulse signal is generated by a pulse coil.

19. The ignition control system of claim 14, wherein the control device comprises a digital control device including:
- a pulse cycle measuring device that measures the cycle of the pulse signal and outputs a pulse cycle signal;
- a differential computing device that computes cyclic variations of the pulse signal and outputs a differential signal indicative of the computed result;
- a pulse cycle estimating device that estimates a cycle of a succeeding pulse signal based on the pulse cycle signal and the differential signal and outputs a pulse cycle estimating signal indicative of the estimated result;
- an ignition control device that produces an ignition control signal based on the comparison result and the pulse cycle signal;
- an ignition timing computing device that computes ignition timing of the engine based on the pulse signal and the pulse cycle estimating signal, and outputs an ignition timing signal indicative of computed ignition timing; and
- an igniting device that outputs an ignition signal based on the ignition control signal and the ignition timing signal.

20. The ignition control system of claim 19, further comprising:
- a first memory that sequentially stores the pulse cycle signal and the differential signal and that sequentially provides the pulse cycle signal and the differential signal to the pulse cycle estimating device; and
- a second memory that stores an ignition angle data and that provides the ignition timing computing device with the ignition angle data corresponding to the pulse cycle estimating signal.

* * * * *